June 25, 1957  E. SCHLUETER  2,796,657
PIVOTED JAW ARMOR CUTTER
Filed Aug. 27, 1954
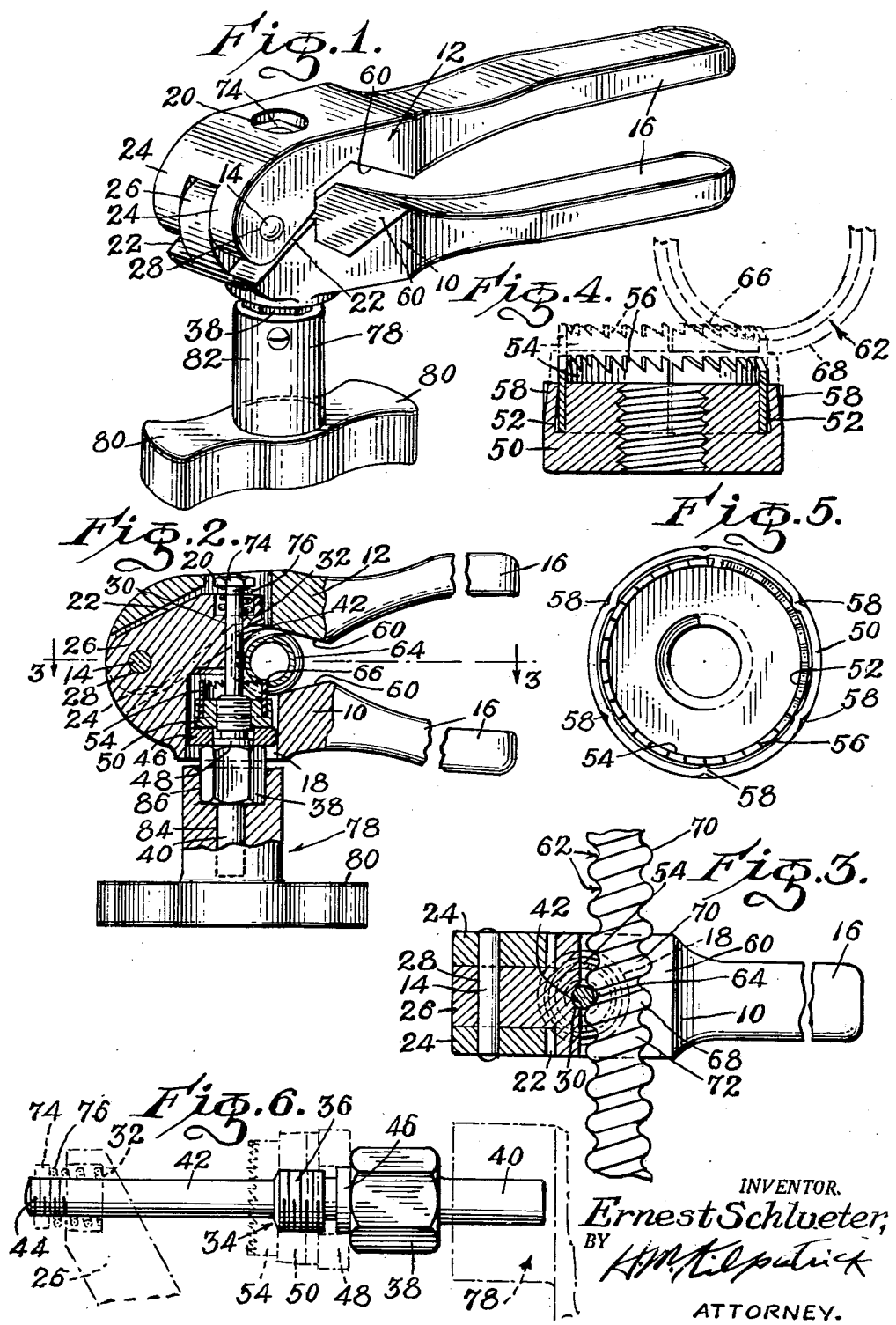
INVENTOR.
Ernest Schlueter,
BY
ATTORNEY.

United States Patent Office 2,796,657
Patented June 25, 1957

2,796,657
PIVOTED JAW ARMOR CUTTER
Ernest Schlueter, Troy, N. Y.

Application August 27, 1954, Serial No. 452,521

17 Claims. (Cl. 29—67)

This invention relates to cutters and more particularly to tools for cutting the armor or armored cables, though it is noted in many of the claims the invention is not limited to cutting armor or pipe. This invention relates to improvements on the invention disclosed in my co-pending United States patent application Serial Number 294,697 filed June 20, 1952, for Tubular Saw BX Armor Cutting Tool and Tube Cutter.

Objects of the invention are to provide an improved tool of this kind which is small and easily portable in the pocket and which works to quickly cut BX armor without cutting into the cable or its insulation.

In the installation of these cables the customary way is to cut the armor diagonally by means of a hack saw. Due to the curvature of the surface of the cable, in such a diagonal cut the penetration of a straight hack-saw is the deepest in the center of the cut, decreasing gradually to zero toward the ends of the cut. Hence, if we limit the maximum penetration to the inside surface of the armor, the cut in the armor strip will be incomplete. Conversely, if we attempt to cut the armor strip completely by a straight hack-saw, the maximum penetration of the saw in the center of the cut will be so deep that the insulation of the wires may be damaged, causing a dangerous hazard in the electrical installation.

An object of my invention is to preclude the damaging of the insulation when cutting the BX armor, by providing a cutting means which can cut the armor strip in a line practically parallel to the axis of the cable, and whereby, can sever the armor strip completely without penetrating at any point deep enough to come in contact with the insulation.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a BX armor cutting tool which briefly stated comprises approximately parallel cutter carrying and opposing jaw members relatively pivoted at one end, and a saw shaft rotatably and slidably mounted on the cutter carrying member substantially axially transverse to the members, and having a small diameter positioning part pointing toward the opposing member. A disk shaped saw holder fast on said shaft carries near the carrying member a tubular saw having a projecting toothed edge projecting toward the opposing member. The inner faces of said jaw members are provided near said shaft with opposing transverse flat jaws diverging toward the shaft between which a BX armor may be squeezed against said positioning part engaged between convolutions of the armor. Spring means engaging the carrying member and the positioning part of the shaft draw the saw toward the opposing member and against the armor. A removable handle engaging the shaft exterior to the carrying member serves for manually pressing and rotating the saw against the armor.

In the accompanying drawing showing, by way of example one of many possible embodiments of the invention:

Fig. 1 is a perspective view showing the tool;
Fig. 2 is a fragmental side elevation partly in section showing the tool in position for cutting the armor;
Fig. 3 is a fragmental plan partly in section on the line 3—3 of Fig. 2 showing the small diameter positioning part of the shaft in the trough of the armor;
Fig. 4 is an axial sectional view of the saw holder;
Fig. 5 is a plan showing the saw in the saw holder; and
Fig. 6 is a side elevation of the shaft showing the position of other parts.

My improved BX armor cutting tool comprises elongated approximately parallel cutter carrying and opposing jaw members 10, 12 relatively pivoted by a pivot pin 14 at one end for movement in the same plane and having handles 16 extending from the mid part to the other end. Said members have large approximately cylindrical bearing and receiving openings 18, 20 having their axes approximately coaxial in the mid plane of the pivotal movement and approximately perpendicular to the members 10, 12.

The opposing member 12 has at said mid plane a dividing space 22 extending from the receiving opening through the pivotal axis, to form spaced parts 24, the carrying or bearing member 10 having at said mid plane an extension 26 having a perforation 28 receiving the pivot pin 14, said extension extending into said space 22 and said receiving opening 20 and there provided with a small bore 30 coaxial with the bearing opening 18 and having a countersunk outer end forming a shoulder 32.

A saw shaft 34 having an intermediate threaded part 36 (Fig. 6) disposed in said bearing opening 18 has a large hexagonal head 38 in the outer part of, and exterior to, said bearing opening 18, a small diameter extension 40 exterior to head, and a small diameter rotary pilot rod or positioning part 42 in said bore 30 having a threaded end 44. A bearing washer 46 fitting on an enlarged part 48 of said shaft between said intermediate part 36 and said head 38 and against said head, rotatably and slidably fits in said opening 18.

A thick disk-shaped centrally tapped saw holder 50 (Fig. 4) fast on said intermediate threaded part 36 against said washer 46 has a deep narrow concentric groove 52 in, and near the edge of, its exposed flat face of the holder. A thin saw 54 is fitted in said groove throughout and has a projecting toothed edge 56, the saw being held in the groove 52 by the periphery of the holder being pinched in at several places 58 tightly against the saw. The exposed flat face limits the penetration of the saw teeth.

The inner faces of said jaw members provided near said openings 18, 20 with transverse flat jaw faces 60 diverging toward the shaft between which a BX armor 62 is adapted to be squeezed with the trough 64 between convolutions of the armor received against said positioning part 42 of the shaft, thereby to position the armor with the axis of the saw substantially tangential to the armor and with the saw teeth 56 positioned to be pressed against the armor and to cut as at 66 (Fig. 3) through the most adjacent convolution 68 and through half of the next most adjacent convolutions 70 and 72.

A nut 74 is disposed on the outer end 44 of the positioning part of the shaft; and a spring 76 on said part compressed between said nut and shoulder 32 serves for drawing the saw teeth against the armor.

A removable T-shaped handle 78 of plastic material having outer-end opposite arms 80 and a cylindrical body 82 having an axial bore 84 received on said extension 40 of the shaft and a hexagonal part 86 received on said head for manually pressing and rotating the saw against the armor.

The operation of the armor cutter will be easily understood from the foregoing. The armor is placed transversely between the jaw faces 60 and against the positioning part, if necessary pressing upon the nut 74 with a finger or upon the saw with the armor to give room for the armor against the positioning part 42. Then the jaw handles 16 are squeezed toward each other, causing the jaw faces 60 to force the armor against the positioning part, the spring 76 yieldably drawing the saw teeth to the armor.

Then the handle 78 on the head 38 is forced toward the armor and turned until the teeth cut through the armor until the exposed face of the disk shaped saw holder within the confines of the saw engages the armor and limits the depth of the cutting so that the cable conductors are not cut.

The T-shaped handle 78 may be removed when storing or carrying the tool so as to occupy less space.

The rotary straight diameter rod-like pilot rod or positioning part 42 being fast on the shaft 34 steadies the saw and rotates with the saw to relatively draw the rod into the groove between convolutions of the armor, and is at all times coaxial and alined with said shaft at all pivotal positions of the opposing member; and transverse flat jaws 60 on the inner faces of said members diverging toward and extending approximately to the saw 54 and part 42 will on inward pivotal movement of the members 10, 12 squeeze BX armors of very widely different sizes toward and against said pilot rod or positioning part 42. If the pilot rod 42 engages between troughs between convolutions of the armor, the friction of the rotating pilot rod draws the armor to a position to receive the pilot rod in the trough to cut through the one most adjacent convolution and to position the armor tangential to the axis of the saw in all pivotal clamping positions of the members 10, 12.

I claim as my invention:

1. A BX armor cutting tool comprising approximately parallel cutter carrying and opposing jaw members relatively pivoted at one end; a saw shaft rotatably and slidably mounted on the carrying member substantially axially transverse to the members, and having fast thereon a small diameter positioning part pointing toward the opposing member; a tubular saw fast on said shaft near the carrying member and having teeth projecting toward the opposing member; the inner faces of jaw members being provided near said shaft with opposing transverse flat jaws diverging toward said small diameter part to squeeze the armor against said part to allow the friction of the rotating part to draw the armor to receive said part in the trough between convolutions of the armors of different sizes of pitch; spring means engaging the carrying member and the positioning part of the shaft for drawing the saw toward the opposing member; and a removable handle removably attached to the shaft exterior to the carrying member.

2. A BX armor cutting tool comprising a cutter-carrying member; a saw shaft rotatably and slidably mounted on the carrying member; a tubular saw fast on said shaft near the carrying member and having teeth projecting away from the member; and means carried by the member and having a part at the axis of the saw for holding a BX armor substantially tangential to said axis.

3. A BX armor cutting tool comprising relatively movable cutter-carrying and opposing jaw members; a saw shaft rotatably and slidably mounted on the carrying member; a tubular saw fast on said shaft near the carrying member and having teeth projecting toward the opposing member; a small diameter positioning part carried by one of the members near the opposing member and saw and coaxial with the saw; said members having jaws diverging toward and near said part.

4. A BX armor cutting tool comprising relatively movable cutter-carrying and opposing jaw members relatively pivoted at one end and having handles at the other end; a saw shaft rotatably and slidably mounted on the carrying member and having a tubular saw fast on said shaft near the carrying member and having teeth projecting toward the opposing member; and means carried by said members for holding an armor between the members in position to be cut by one side only of the saw.

5. A BX armor cutting tool comprising a cutter-carrying member; a saw shaft rotatably and slidably mounted on the carrying member and having a coaxial small diameter positioning part remote from the member; a tubular saw fast on said shaft near the carrying member and having teeth projecting away from the member; and means carried by the member for holding a BX armor transverse to the member against said part.

6. A BX armor cutting tool comprising a cutter-carrying jaw member; a saw shaft rotatably and slidably mounted on the carrying member; a tubular saw fast on said shaft near the carrying member and having teeth projecting away from the member; and means carried by the member and holding a BX armor substantially tangential to the axis of the saw in position to be cut by the saw and having a part substantially at the axis of the saw engaging the trough between convolutions of the armor.

7. A BX armor cutting tool comprising relatively movable cutter-carrying bearing and opposing jaw members; the bearing member having a large bearing opening having its axis approximately longitudinal to the path of relative movement of the members; the carrying member having an extension extending toward the opposing member and provided with a bore coaxial with the bearing bore; a saw shaft having an angular head in part in the outer part of the bearing opening, and a small diameter positioning part projecting through said bore; a bearing washer on said shaft adjacent to said washer and having a toothed edge projecting toward the opposing member; the inner faces of said members being provided near said shaft with transverse flat jaws diverging toward the shaft; a spring engaging said positioning part and said extension for drawing the saw toward the armor; and an exterior handle having a hexagonal recess received on said head.

8. A cutting tool comprising elongated approximately parallel cutter carrying and opposing jaw members relatively pivoted at one end for movement in the same plane and having handles extending from the mid part to the other end; said members having large approximately cylindrical bearing and receiving openings having their axes approximately coaxial in the mid plane of pivotal movement and approximately perpendicular to the members; the opposing member having at said mid plane a dividing space extending from the receiving opening through the pivotal axis, to form spaced parts; a pivot pin passing through said spaced parts; the carrying member having at said plane an extension extending into said space and having a transverse perforation receiving said pin; said extension extending into the receiving opening and there provided with a small bore coaxial with the bearing opening and having countersunk outer end forming a shoulder; a saw shaft rotatably and slidably mounted in the bearing opening and having a small diameter positioning part projecting through said bore and carrying an end nut; a tubular saw fast on said shaft near the carrying member and having teeth projecting toward the opposing member; said members having jaws diverging toward and near said small diameter part; a handle on the shaft exterior to the carrying member; and a spring compressed between the nut and said shoulder.

9. A cutting tool comprising relatively movable cutter-carrying and opposing jaw members having axially alined large receiving and bearing openings; a saw shaft having an intermediate threaded part disposed in said bearing opening carrying, a large hexagonal head in the outer part of, and exterior to, said bearing opening, a small diameter extension exterior to the head, and a small diameter positioning part in said receiving opening; a bearing washer on said intermediate part against said head and rotatably and slidably fitting in said opening; a thick disk-shaped centrally tapped saw holder fast on said intermediate threaded part against said washer and having a deep narrow concentric groove in, and near the edge of, its exposed flat face; a thin saw fitted in said groove throughout and having a projecting toothed edge; the saw being held in the groove by the periphery of the holder being pinched in at several places tightly against the saw, said members having jaws diverging toward and near said small diameter part; and a handle having a socket receiving said head and extension.

10. A BX armor cutting tool comprising relatively movable cutter-carrying and opposing jaw members; a saw shaft rotatably and slidably mounted on the carrying member and having a small diameter positioning part near the opposing member; a tubular saw coaxially fast on said shaft near the carrying member and having teeth projecting toward the opposing member; the inner faces of jaw members being provided near said shaft with transverse flat jaw diverging toward the shaft between which a BX armor is adapted to be squeezed, with the trough between convolutions of the armor received against said positioning part of the shaft, thereby to position the armor with the axis of the saw tangential to the armor and with the saw positioned to be pressed against the armor and to cut through the most adjacent convolutions and through half of the next most adjacent convolutions; and a handle on the shaft exterior to the carrying member.

11. A BX armor cutting tool comprising approximately parallel cutter carrying and opposing jaw members relatively pivoted at one end and having handles extending to the other end; said members having large bearing and receiving openings approximately coaxial, and transverse to the members; the carrying member having an extension extending into said receiving opening and there provided with a small bore coaxial with the bearing bore; a saw shaft having a hexagonal head in the outer part of, and exterior to, said bearing opening, and a small diameter positioning part in said bore and an extension exterior to the head; a bearing washer on said shaft against said head and rotatably and slidably fitting in said bearing opening; a disk-shaped saw-holder fast on said shaft against said washer and having a concentric groove in, and near the edge of, its exposed flat face; a saw fast in said groove throughout and having a projecting toothed edge; the inner faces of saw members being provided near said openings with transverse flat jaws diverging toward the shaft between which a BX armor is adapted to be squeezed with the trough between convolutions of the armor received against said positioning part of the shaft, thereby to position the armor; a nut on the outer end of the positioning part of the shaft; a spring on said part compressed between said nut and shoulder for pressing the saw against the armor; and a removable T-shaped handle of plastic material having outer-end opposite arms and a cylindrical body having an axial bore received on said extension of the shaft and a hexagonal part received on said head for pressing and rotating the saw against the armor.

12. A BX armor cutting tool comprising an elongated cutter-carrying member; a saw shaft rotatably and slidably mounted on the carrying member; a tubular saw fast on said shaft near the carrying member and having teeth projecting in a direction away from said carrying member; and positioning means carried by the carrying member having a part at the axis of the saw for holding a BX armor substantially tangential to said axis; said positioning means comprising an opposing member approximately parallel to the carrying member and movably mounted on the carrying member, a small diameter straight rod-like positioning part fast on and alined and coaxial with said shaft; and transverse flat jaws on the inner faces of said members diverging toward said positioning part, between which transverse flat jaws are adapted to be mounted, BX armors of different sizes which may be squeezed toward and against said positioning part, with the trough between convolutions of the armor received against said positioning part, thereby to position the armor tangential to said axis, thereby to position the saw to have cutting engagement with the armor at one semicircumference only of the saw.

13. A BX armor cutting tool comprising an elongated cutter-carrying member; a saw shaft rotatably and slidably mounted on the carrying member; a tubular saw coaxially fast on said shaft near the carrying member and having teeth projecting in a direction away from said carrying member; and positioning means carried by the carrying member for holding a BX armor on the carrying means substantially tangential to the axis of the shaft; said positioning means comprising an elongated opposing member approximately parallel to the carrying member and having a pivotal connection with the carrying member; said members having handles extending from said connection; a positioning part having a straight edge; means carried by the tool for holding said positioning part with its straight edge alined with said shaft at all pivotal clamping positions of the opposing member; and transverse wide, long flat jaws on the inner faces of said members diverging toward and extending approximately to said saw and positioning part, between which transverse flat jaws are adapted to be mounted, BX armors of widely different sizes which may be squeezed toward and against said straight edge of the positioning part, with the trough between convolutions of the armor received against said part, thereby to positively position steadily the armor tangential to the axis of the saw in all pivotal clamping positions of the opposing member.

14. A BX armor cutting tool comprising an elongated cutter-carrying member; a saw shaft rotatably and slidably mounted on the carrying member; a tubular saw coaxially fast on said shaft near the carrying member and having teeth projecting in a direction away from said carrying member; and positioning means carried by the carrying member for holding a BX armor on the carrying means substantially tangential to the axis of the shaft; said positioning means comprising an elongated opposing member approximately parallel to the carrying member and having a pivotal connection with the carrying member; a straight small diameter rod-like positioning part fast on said shaft, all parts of the positioning part being alined with said shaft at all pivotal clamping positions of the opposing member; transverse flat jaws on the inner faces of said members diverging toward and extending approximately to said saw and part, between which transverse flat jaws are adapted to be mounted, BX armors of widely different sizes which may be squeezed toward and against said positioning part, with the trough between convolutions of the armor received against said part, thereby to position the armor tangential to the axis of the saw in all pivotal clamping positions of the opposite member thereby to hold the armor in position to be cut by the saw at one semicircumference only of the saw, thereby to cut through only one place of only the most adjacent convolution of the armor and through only one place of half of the next most adjacent convolutions respectively, thus cutting the armor with a minimum of cutting, work, cost and mutilation.

15. A BX armor cutting tool comprising an elongated cutter-carrying member; a saw shaft rotatably and slidably mounted on the carrying member; a tubular saw coaxially fast on said shaft near the carrying member and having teeth projecting in a direction away from said carrying member; and positioning means carried by the carrying member for holding a BX armor on the carrying means substantially axially transverse to an axially offset from the axis of the shaft; said positioning means comprising an elongated opposing member approximately parallel to the carrying member and having a pivotal connection with the carrying member, said members having approximatly parallel handles extending from said connection; an extension on the carrying member having a portion spaced from the carrying member at the shaft and extending substantially to the opposing member and provided with a small bore coaxial with the shaft; a straight small diameter rod-like positioning part fast on said shaft and in said bore, all parts of the positioning part being coaxial and alined with said shaft at all pivotal clamping positions of the opposing member; transverse flat jaws on the inner faces of said members diverging toward and extending approximately to said saw and part, between which transverse flat jaws are adapted to be mounted, BX armors of widely different sizes which may be squeezed by the jaws toward and against said positioning part, with the trough between convolutions of the armor received against said part, thereby to position the armor tangential to the axis of the saw in all pivotal clamping positions of the opposing member; and means for rotating the shaft.

16. A BX armor cutting tool comprising an elongated cutter-carrying member; a saw shaft rotatably and slidably mounted on the carrying member; a tubular saw coaxially fast on said shaft near the carrying member and having teeth pointing in a direction away from said carrying member; and positioning means carried by the carrying member for positioning and holding a BX armor on the carrying means substantially tangential to the axis of the shaft; said positioning means comprising an elongated opposing member approximately parallel to the carrying member and opposed to said teeth and having a pivotal connection with the carrying member, said members having approximately parallel handles extending in a direction from said connection; an extension on the carrying member having a portion spaced from the carrying member at the shaft and extending substantially to the opposing member and provided with a small bore coaxial with the shaft; a straight small diameter rod-like positioning part fast on said shaft and in said bore, all parts of the positioning part being coaxial and alined with said shaft at all pivotal clamping positions of the opposing member; transverse flat jaws on the inner faces of said members diverging toward and extending appproximately to said saw and part, between which transverse flat jaws are adapted to be mounted, BX armors of widely different sizes which may be squeezed by the jaws toward and against said positioning part, with the trough between convolutions of the armor received against said part, thereby to position the armor tangential to the axis of the saw in all pivotal clamping positions of the opposing member; and means for rotating the shaft.

17. A BX armor cutting tool comprising an elongated cutter-carrying member; a saw shaft rotatably and slidably mounted on the carrying member; a tubular saw coaxially fast on said shaft near the carrying member and having teeth projecting in a direction away from said carrying member; an elongated opposing member approximately parallel to the carrying member and having a pivotal connection with the carrying member; a straight small diameter rod-like positioning part fast on said shaft coaxial and alined with said shaft at all pivotal clamping positions of the opposing member; and transverse long wide flat jaws on the inner faces of said members diverging toward and extending approximately to said saw and positioning part, between which transverse flat jaws are adapted to be mounted, BX armors of widely different sizes which may be squeezed toward and against said straight positioning part, with the trough between convolutions of the armor received against said part, thereby to positively and steadily position the armor tangential to the axis of the saw in all pivotal clamping positions of the opposing member.

References Cited in the file of this patent

UNITED STATES PATENTS

| 787,578 | Lambert | Apr. 18, 1905 |
| 1,459,548 | Morison | June 19, 1923 |
| 2,031,470 | Eck et al. | Feb. 18, 1936 |
| 2,572,607 | Foster et al. | Oct. 23, 1951 |
| 2,642,651 | St. Palley | June 23, 1953 |
| 2,687,560 | St. Palley | Aug. 31, 1954 |